(12) United States Patent
Nishikawa et al.

(10) Patent No.: US 8,536,487 B2
(45) Date of Patent: Sep. 17, 2013

(54) ARC WELDING METHOD

(75) Inventors: Seigo Nishikawa, Kitakyushu (JP); Kanji Katada, Hirakata (JP); Hirotaka Adachi, Hirakata (JP); Tsuneo Shinada, Ebina (JP); Hideyasu Machii, Ebina (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 375 days.

(21) Appl. No.: 12/780,076

(22) Filed: May 14, 2010

(65) Prior Publication Data

US 2010/0288742 A1 Nov. 18, 2010

(30) Foreign Application Priority Data

May 15, 2009 (JP) ................... 2009-118573

(51) Int. Cl.
*B23K 9/10* (2006.01)
(52) U.S. Cl.
USPC ............... 219/130.51; 219/130.4; 219/137 R; 219/137 PS; 219/137.71
(58) Field of Classification Search
USPC ............. 219/137 PS, 137 R, 130.51, 130.5, 219/130.4, 130.1, 121.11, 137.71
See application file for complete search history.

(56) References Cited

U.S. PATENT DOCUMENTS

| 2,680,181 A | 6/1954 | Tuthill et al. |
| 3,825,712 A * | 7/1974 | Gibbs ........................ 219/137 R |
| 4,427,874 A * | 1/1984 | Tabata et al. ............. 219/130.51 |
| 4,463,243 A * | 7/1984 | Church .......................... 219/74 |
| 5,349,159 A * | 9/1994 | Mita et al. ............... 219/137 PS |
| 2006/0138115 A1* | 6/2006 | Norrish et al. ........... 219/137.71 |

FOREIGN PATENT DOCUMENTS

| JP | 56-134078 A | 10/1981 |
| JP | 3-110070 A | 5/1991 |
| JP | 4-309488 A | 11/1992 |
| JP | 5-261535 A | 10/1993 |
| JP | 11-147175 A | 6/1999 |
| JP | 11-291042 A | 10/1999 |
| JP | 2001-001141 A | 1/2001 |
| JP | 2004-243372 A | 9/2004 |

OTHER PUBLICATIONS

Extended European Search Report issued in Application No. 10161541.7, dated Sep. 14, 2010.
Office Action, dated May 7, 2013, issued by the Japanese Patent Office in counterpart Japanese Patent Application No. 2009-118573.

* cited by examiner

*Primary Examiner* — Pho M Luu
*Assistant Examiner* — Thao Bui
(74) *Attorney, Agent, or Firm* — Sughrue Mion, PLLC

(57) ABSTRACT

A consumable electrode type arc welding method for generating arc between a plate-shaped work and a welding wire by a mixed shield gas including argon gas to weld the plate-shaped work, includes:

making a state of reverse polarity in which the polarity of the welding wire is positive at the welding start time, and switching at least once to a state of positive polarity in which the polarity of the welding wire is negative.

10 Claims, 8 Drawing Sheets

WELDING CONDITION
{
WIRE DIAMETER: 1.4mm
WIRE FEEDING SPEED: 35m/MIN.
AC FREQUENCY: 20Hz
AC RATIO: 50%
WELDING CURRENT: 670A
WELDING VOLTAGE: 42V
PLATE THICKNESS: 12mm
}

BEAD LENGTH: ABOUT 250mm

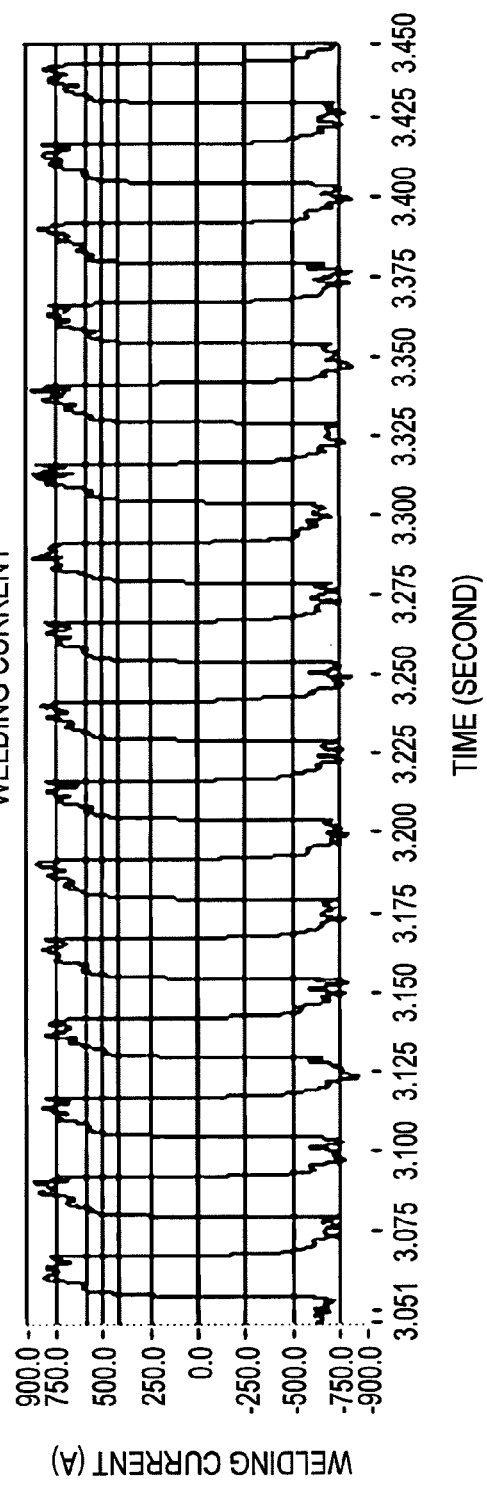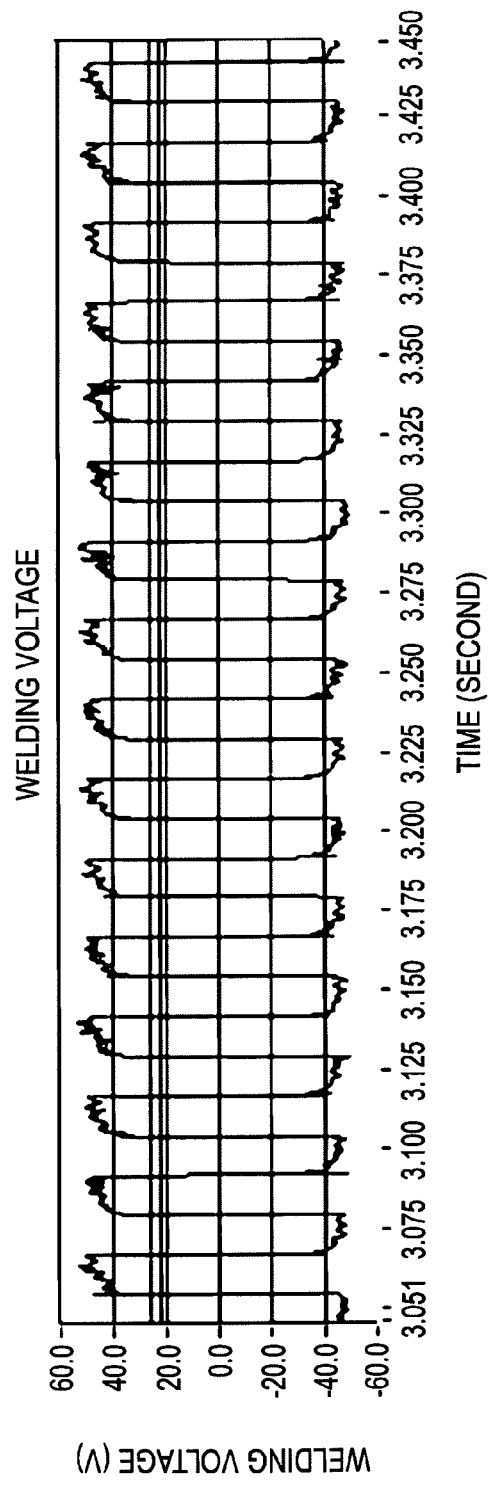
FIG. 8A
FIG. 8B

WELDING CONDITION { WIRE DIAMETER: 1.4mm
WIRE FEEDING SPEED: 35m/MIN.
AC FREQUENCY: 40Hz
AC RATIO: 50%
WELDING CURRENT: 670A
WELDING VOLTAGE: 42V
PLATE THICKNESS: 12mm

BEAD LENGTH: ABOUT 240mm

ARC WELDING METHOD

CROSS-REFERENCE TO RELATED APPLICATION

This application is based on and claims priority under 35 U.S.C. §119 from Japanese Patent Application No. 2009-118573 filed on May 15, 2009.

BACKGROUND OF THE INVENTION

1. Field

The present invention relates to a consumable electrode type arc welding method, and particularly to an arc welding method which performs thick-plate welding by means of large current.

2. Description of the Related Art (Current Increase/High Deposition in Arc Welding for Thick-Plate Work)

In arc welding for the work of such a thick-plate work that the thickness is 8 mm or more, increase of current and high deposition are demanded in order to improve efficiency and productivity of the welding operation. To meet such the demand, it is necessary to increase the welding-wire supplying amount per unit time as much as possible.

Therefore, methods of increasing the welding-wire feeding speed and further supplying the large current to the welding wire have been recently investigated.

In order to subject thick plates to high deposition, tandem welding in which the number of torches has been increased to the plural number is disclosed (for example, refer to JP-A-2004-243372).

In JP-A-2004-243372, measure of increasing the deposition amount by adding a torch to two torches, that is, by using three torches has been disclosed. The increase in the number of torches enables the electric current produced per torch to decrease, so that there are advantages that the strong magnetic field is not generated and the weld penetration does not become too deep.

Further, for thick-plate welding, a welding method has been disclosed in which a flux-cored wire or a metal-cored wire having the large diameter is used, and the amount of spatter is reduced by performing one-pass execution by tandem welding of a leading electrode and a trailing electrode by the welding current of AC (alternating current) 600 to 1900 A, or by performing multi-pass execution by a single electrode (for example, refer to JP-A-11-147175).

(Common Defects in Two Related Methods)

However, such the related arts, since the welding-wire feeding speeds are 7.5 m/min. in JP-A-11-147175 and 13 m/min. in JP-A-2004-243372, cannot meet fully the demand that high deposition is obtained by increasing the welding-wire feeding speed.

Further, in consumable electrode type arc welding by the large current, in case that the welding-wire feeding speed is increased, such a phenomenon is confirmed that the strong magnetic field is generated by the welding current thereby to cause the arc to start rotating and the wire tip rotates rapidly at a high speed with this arc rotation. For example, in MAG (Metal Active Gas) welding by means of a wire of 1.4 mm in diameter, in case that welding is performed in a state where the welding current exceeds 600 A and the welding-wire feeding speed is 25 m/min. or more, the arc starts to rotate. When the wire tip rotates at the high speed, the wire tip is brown off by the centrifugal force produced by the rotation and spatter is generated, so that welding itself becomes unstable.

On the other hand, in case that the arc length is decreased in order to reduce the influence of the arc rotation under the state where the current and welding-wire feeding speed are large, the arc power becomes strong, so that there is produced a problem that the weld penetration in the work formed by the arc power becomes too deep.

Neither of the related arts described in JP-A-2004-243372 and JP-A-11-147175 can respond to such the problems produced in the state where the current and welding-wire feeding speed are large.

(Another Defect in Method of JP-A-2004-243372)

Further, for such tandem welding as described in JP-A-2004-243372, it is extremely difficult to execute welding while keeping both of the leading electrode and the trailing electrode at the optimum posture for the welding portion including a curve. Therefore, the tandem welding is not easy to be applied to the work having many curves.

Further, since welding by the respective torches interfere with each other, special control for avoiding the interference between the torches is required. Furthermore, it is not easy to set the welding condition of each torch. Therefore, application of the plural torches to an automation line of welding has limitation.

(Another Defect in Method of JP-A-11-147175)

Further, in JP-A-11-147175, a combined wire such as a flux-cored wire or a metal-cored wire is used as the welding wire. Since these wires are more expensive than a solid wire, there is a problem in cost.

SUMMARY OF THE INVENTION

The invention has been made in view of such the problems accompanied with large-current/high deposition welding for thick plate, and has an object to provide an arc welding method in which large-current/high deposition which is equal to or more than that in case of using plural torches is realized by a single torch while keeping high-speed wire feeding, and stable welding is performed by suppressing high-speed rotation of a wire tip and reducing greatly generation of spatter.

In order to solve the above problem, the invention is constituted as follows.

According to a first aspect of the invention, there is provided a consumable electrode type arc welding method for generating arc between a plate-shaped work and a welding wire by a mixed shield gas including argon gas to weld the plate-shaped work, including:

making a state of reverse polarity in which the polarity of the welding wire is positive at the welding start time, and switching at least once to a state of positive polarity in which the polarity of the welding wire is negative.

According to a second aspect of the invention, there is provided the arc welding method according to the first aspect, wherein if a welding-wire feeding speed is below 25 m/min., a state of reverse polarity is made, and if the welding-wire feeding speed is 25 m/min or more, the state of reverse polarity is switched to the state of positive polarity.

According to a third aspect of the invention, there is provided the arc welding method according to the first aspect, wherein the state of reverse polarity is switched to the state of positive polarity after several seconds has passed after the welding-wire feeding starts.

According to a fourth aspect of the invention, there is provided the arc welding method according to the third aspect, wherein switching the state of reverse polarity to the state of positive polarity, when the welding-wire feeding speed is 25 m/min. or more, or after several seconds has passed since the welding-wire feeding starts, and repeating to switch the state of positive polarity to the state of reverse polarity at a frequency of 10 Hz or more.

According to a fifth aspect of the invention, there is provided the arc welding method according to the second or the third aspect, wherein the thickness of the plate-shaped work is 8 mm or more, the wire diameter of the welding wire is 1.2 to 1.6 mm, and a welding current is 600 A or more.

According to the above first to fifth aspects, it is possible to realize stable consumable electrode type arc welding in which the high-speed rotation of a wire tip is suppressed while large-current/high deposition which is equal to or more than that in case of using plural torches is being realized for the thick-plate work by a single torch, and the generation of spatter is greatly reduced.

BRIEF DESCRIPTION OF THE DRAWINGS

FIG. 8A is a diagram showing a welding current waveform in case that AC frequency is 40 Hz;

FIG. 8B is a diagram showing a welding voltage waveform in case that AC frequency is 40 Hz;

DETAILED DESCRIPTION OF THE PREFERRED EMBODIMENTS

Regarding the invention in which large-current/high deposition which is equal to or more than that in case of using plural torches is realized by a single torch while keeping high-speed wire feeding, and stable welding is performed by suppressing high-speed rotation of a wire tip and reducing greatly generation of spatter, its embodiments will be described below with reference to drawings.

Embodiment 1

(Welding Condition in Embodiment 1)

In this embodiment, in consumable electrode type arc welding for the work having a thickness of 8 mm or more by use of a mixed shielding gas of argon and $CO_2$, a welding wire of 1.2 to 1.6 mm in diameter and the welding current of 600 A or more are used.

(In Case that the Welding Condition in Embodiment 1 is not Changed, a Wire Tip Starts to Rotate at a High Speed Under this Condition.)

In case that welding is performed at a wire-feeding speed of 25 m/min. or more under the above condition, a wire tip starts to rotate at a high speed. Since the high-speed rotation of the wire tip causes the spatter as described before, it is an essential condition to suppress this high-speed rotation of the wire tip in order to perform stable welding by the large current.

(Mechanism in which Wire Tip Starts to Rotate at High Speed in Large Current Area)

The inventor of this invention has investigated the mechanism in which the wire tip starts to rotate at a high speed in the large current area, with the result that he has noticed that the following phenomena (A) and (B) exist in the high-speed rotation mechanism.

(A) Since a large magnetic field is generated around the welding wire in the large current state, the arc and the wire tip start to rotate by this magnetic force.

However, it takes some time for the wire tip to come to rotate at such a high speed as to blow off.

(B) In case that the arc concentrates onto the wire tip in the large current state, a droplet at the wire tip is always put in such a unstable state that the droplet repeats "separation" and "not separation" from the wire tip. The generation of arc from such the unstable droplet causes the high-speed rotation of the wire tip.

(Condition of Test)

As a result of finding of such the phenomena (A) and (B), the inventor has executed a test of MAG welding for the work having a thickness of 12 mm under the following condition: Wire diameter: 1.4 mm, Welding current: 600 A or more, and Wire feeding speed: 25 m/min. or more.

On the basis of a result of this test, the contents of the invention will be described below.

(Whole Constitution of Arc Welding Apparatus which Executes a Method of the Invention)

Figure 1:
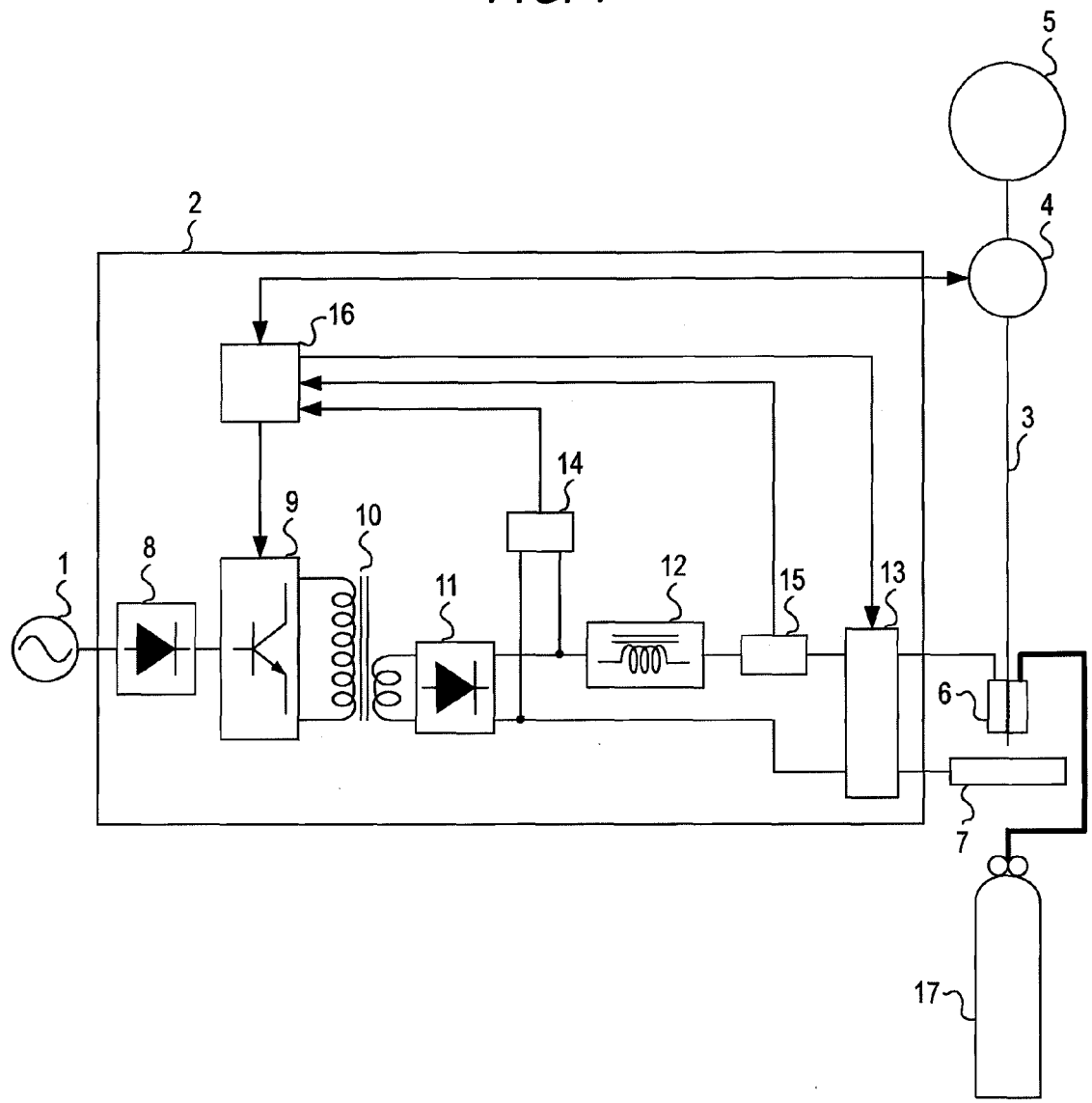
FIG. 1 is a schematic diagram showing the constitution of a welding apparatus which executes an arc welding method of the invention.

FIG. 1 is a schematic diagram showing the constitution of a welding apparatus which executes an arc welding method of the invention. In FIG. 1, a welding power supply 2 to which electric power is supplied from a three-phase AC (alternating-current) power supply 1 controls a wire feeding device 4 thereby to control the supply speed of a wire 3 supplied from a wire spool 5 toward a work 7, and supplies high power through a power supply device 6 to the wire 3 thereby to generate arc discharge between the wire 3 and the work 7.

At this time, from a gas cylinder 17 filled with shield gas, the shield gas is supplied so as to jet from a tip of the wire 3 toward the work 7. The shield gas uses a mixed shield gas including argon of 80% and $CO_2$ of 20%.

(Constitution of Welding Power Supply 2)

The welding power supply 2 includes a converter 8 to a control part 16.

When the direct current is supplied to an inverter 9 from the converter 8 which converts the three-phase alternating current into the direct current, the inverter 9 converts its DC current into the high-frequency AC current. The high-frequency alternating current outputted from the inverter 9, after the current and the voltage have been converted by a transformer 10, is converted again into the DC current by a converter 11. Since the DC current outputted from the converter 11 is pulsating, it is smoothened by a reactor 12.

A reference numeral 13 is a EP (reverse polarity)/EN (Positive polarity) switching part, which, while setting the reverse (EP) polarity in which the wire side is the positive polarity and the work side is the negative polarity, or the positive (EN) polarity in which the wire side is the negative polarity and the work side is the positive polarity, and switching the EP polarity and the EN polarity, supplies the electric power between the power supply device 6 for the wire and the work 7.

A reference numeral 14 is a voltage detecting sensor which detects the welding voltage between the wire and the work, and a reference numeral 15 is a current detecting sensor which detects the welding current flowing between the wire and the work.

(Three Functions of Control Part 16)

Each output from the voltage detecting sensor 14 and the current detecting sensor 15 is input to the control part 16. The control part 16 controls the inverter 9 inside the welding power supply on the basis of each output from the both sensors.

Further, in the wire feeding device 4, an encoder and a motor, which are not shown herein, are incorporated, and the control part 16 controls this motor thereby to feed the wire 3 from the wire spool 5 to the work 7 side at the predetermined wire-feeding speed.

The control part 16, in addition, instructs the EP/EN switching part 13 on switching.

(In Case that Welding Current and Wire Feeding Speed are Low in Consumable Electrode Type Arc Welding)

Under such the constitution as shown in FIG. 1, the mixed shield gas of argon and $CO_2$ is supplied from the gas cylinder 17, and direct-current arc welding is performed using a welding wire of 1.4 mm in diameter in the reverse polarity (EP polarity) in which the wire 3 side is the positive polarity and the work 7 side is the negative polarity. An arc state of the wire tip portion in case of such the consumable electrode type arc welding will be described with reference to a schematic diagram of FIG. 2.

The tip of the wire 3 is heated by heat of the arc, whereby a wire tip droplet 18 is formed. The wire tip droplet 18 is a melted metal ball. Although the wire tip droplet 18 is attaching to the tip of the wire 3 by surface tension and viscosity, as the metal ball grows, it drops toward the work 7 by the pinch force of the welding current and the force of gravitation. The amount of wire fed from the wire feeding device 4 balances with the wire amount of the wire tip droplet 18 dropping toward the work 7, whereby the arc length of an arc 19 becomes constant.

(In Case that Welding Current and Wire Feeding Speed are High in Consumable Electrode Type Arc Welding)

Figure 2:
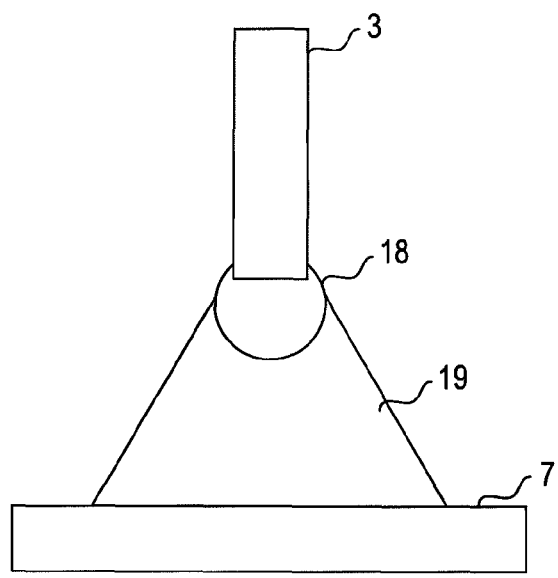
FIG. 2 is a schematic diagram showing an arc state of a wire tip portion in case that DC (direct current) arc welding is performed with EP polarity (reverse polarity)
Figure 3A:
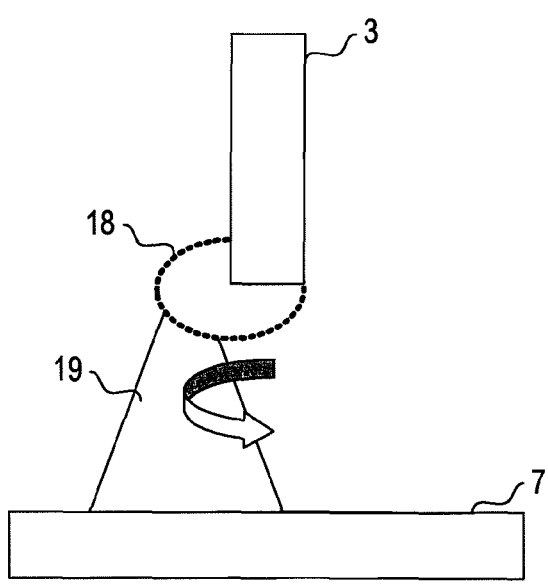
FIGS. 3A and 3B are diagrams showing a state where a wire tip droplet and arc rotate with increase of the welding-wire feeding speed.
Figure 3B:
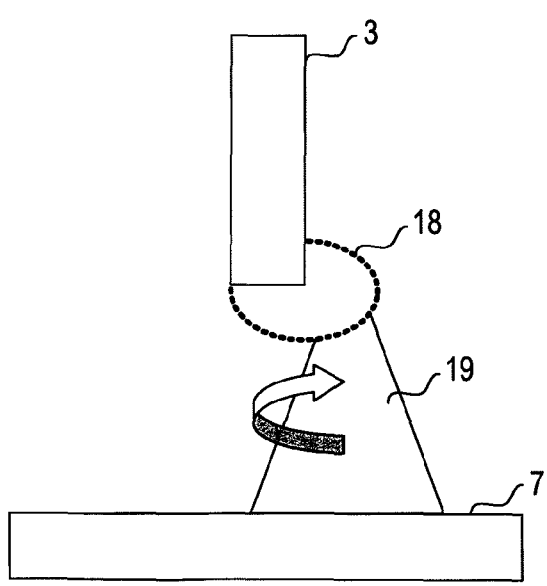

In the state of FIG. 2, in case that the welding current is set at 600 A or more and the wire is fed out at the feeding speed of 25 m/min. or more, discharges in two states including a discharge in a state where the wire tip droplet 18 is deviated from the tip of the wire 3 in a lateral direction as shown in FIG. 3A, and a discharge in a state where the wire tip droplet 18 is deviated in the reverse direction as shown in FIG. 3B are repeated, so that the wire tip droplet 18 and the arc 19 start to rotate by the magnetic force.

When the rotational speed becomes high, the wire tip droplet 18, without dropping onto the work 7 located just under, scatters around as spatter by the centrifugal force.

(EP/EN Switching in the Invention)

In the invention, such the arc rotation as shown in FIG. 3 is suppressed as follows:

In case that the welding condition in the welding apparatus of FIG. 1 is set so that the welding current is 600 A or more and the wire feeding speed is 25 m/min. or more (since the method of setting the welding current, the welding voltage and the wire feeding speed in the welding apparatus has been known, its details will be omitted here), the control part 16 instructs the EP/EN switching part 13 to switch the EP polarity and the EN polarity by the predetermined frequency.

(Working/Advantage of EP/EN Switching in the Invention)

Figure 4:
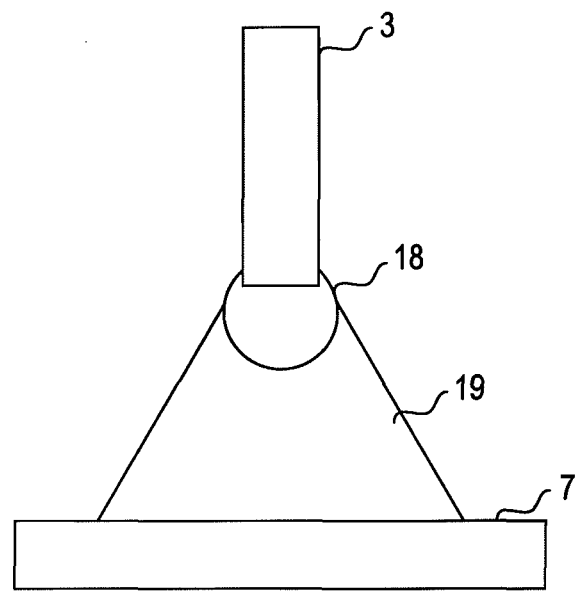
FIG. 4 is a schematic diagram showing an arc state of the wire tip portion in the EP polarity.
Figure 5:
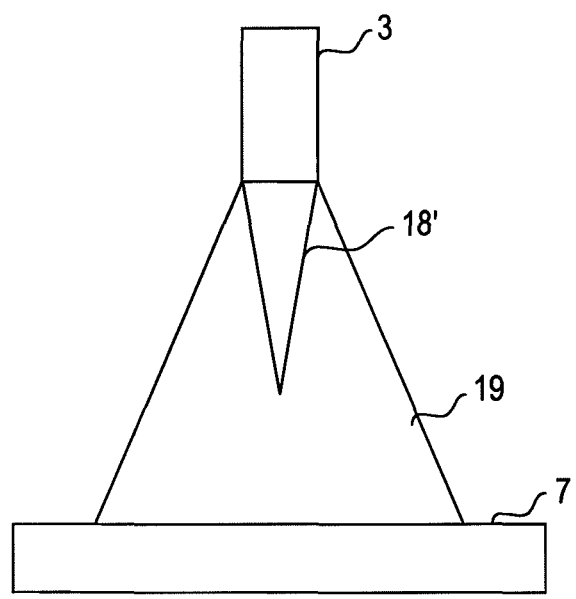
FIG. 5 is a schematic diagram showing an arc state of the wire tip portion in EN polarity (positive polarity)

FIG. 4 is a schematic diagram of an arc state in the EP polarity, and FIG. 5 is a schematic diagram of an arc state in the EN polarity.

In case of such the EP polarity as shown in FIG. 4, the shape of the wire tip droplet 18 is the same as that in FIG. 2. In case of the EN polarity, since the generated arc 19 ascends to the upper portion of the wire 3 as shown in FIG. 5, the wire tip droplet 18 becomes an inverted cone droplet 18' extending downward, which is different from the case in FIG. 4.

In case that switching between the EP polarity and the EN polarity is performed by the predetermined frequency, the wire tip portion repeats such the droplet state 18 in FIG. 4 and inverted cone state 18' in FIG. 5 every time the switching is performed.

In case that switching between the EP polarity and the EN polarity is thus performed, the direction of the welding current is inverted. Therefore, the direction of the magnetic force generated with the welding current is also inverted. The inversion of the direction of the magnetic force causes the direction of the force rotating the wire tip droplet 18 and the arc 19 to invert. By performing this inversion periodically, the rotation of the arc stops. When the rotation of the arc stops, the centrifugal force does not act, so that the generation of the spatter can be suppressed greatly.

In the test by the inventor of the invention, it has been confirmed that: in case that the switching frequency between the EP polarity and the EN polarity, that is, the AC (alternating-current) frequency is set to 10 Hz or more under the condition where the wire feeding speed is 25 m/min. or more, there is an advantage that the arc rotation stops.

(In Case of Welding Test in which EP/EN Switching According to the Invention is Performed at 20 Hz)

Figure 6A:
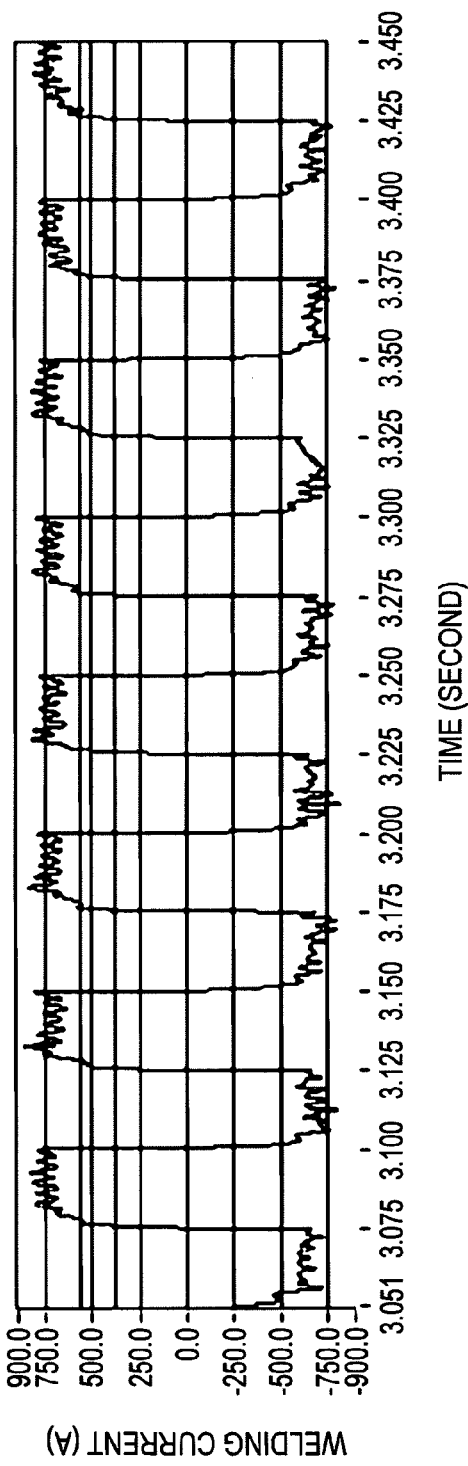
FIG. 6A is a diagram showing a welding current waveform in case that AC (alternating current) frequency is 20 Hz.
Figure 6B:
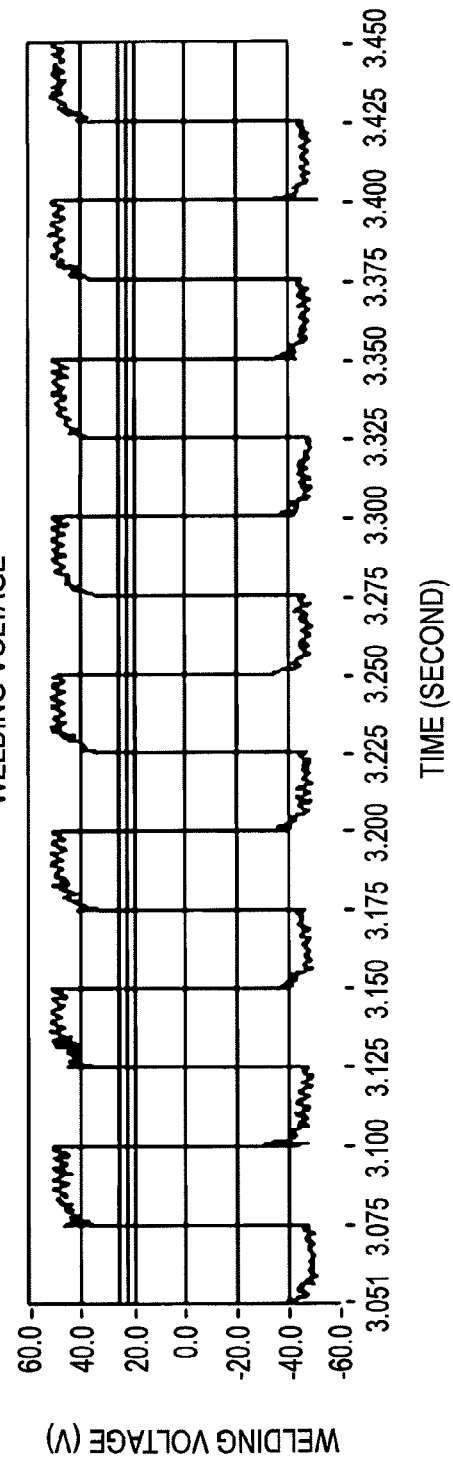
FIG. 6B is a diagram showing a welding voltage waveform in case that AC frequency is 20 Hz.
Figures 7A, 7B:
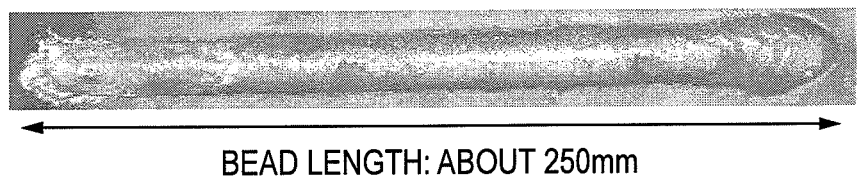
FIG. 7A is a diagram showing welding conditions including a case in which AC frequency is 20 Hz.
FIG. 7B is an external view of a bead welded under the welding condition 7 (A)

The current waveform in the welding test time at the AC frequency of 20 Hz is shown in FIG. 6A, and the voltage waveform in that time is shown in FIG. 6B. Further, other detailed welding conditions in that time are shown in FIG. 7A. The welding conditions are that: (1) the diameter of the used wire is 1.4 mm, (2) the wire feeding speed is 35 m/min., (3) the frequency of the alternating current supplied to the wire is 20 Hz, (4) the AC rate is 500, (5) the welding current is 670 A, (6) the welding voltage is 42V, and (7) the thickness of a work to be welded is 12 mm. The "welding current" in (5) means an average value of the AC current. Namely, though the peak of the current waveform in FIG. 6A is 750 A over, the average of values in a half cycle in which the current values become positive is taken as the welding current. Further, the mixed shield gas in which a mixed rate of argon and $CO_2$ is 80:20 is used.

In result, the external appearance of the welding bead produced in the welding test is shown in an external view of FIG. 7B. The welding bead in FIG. 7 at the AC frequency of 20 Hz does not scatter around as spatters, and further the bead formed on the work just under the wire is narrower in width and larger in height than the conventional bead. Therefore, the formed bead is satisfactory.

(In Case of Welding Test in which EP/EN Switching According to the Invention is Performed at the AC Frequency of 40 Hz)

Figures 9A, 9B:
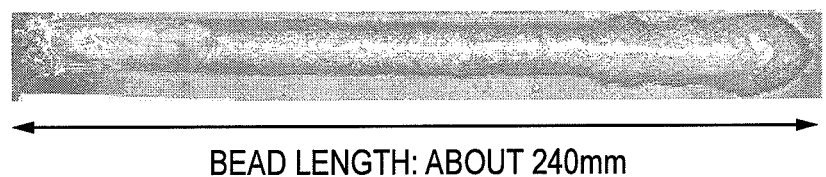
FIG. 9A is a diagram showing welding conditions including a case in which AC frequency is 40 Hz.
FIG. 9B is an external view of a bead welded under the welding condition 9 (A)

The current waveform in the welding test time at the AC frequency of 40 Hz is shown in FIG. 8A, and the voltage waveform in that time is shown in FIG. 8B. Further, other detailed welding conditions in that time are shown in FIG. 9A. The welding conditions are that: (1) the diameter of the used wire is 1.4 mm, (2) the wire feeding speed is 35 m/min., (3) the frequency of the alternating current supplied to the wire is 40 Hz, (4) the AC rate is 50%, (5) the welding current is 670 A, (6) the welding voltage is 42V, and (7) the thickness of a work to be welded is 12 mm. The definition of "welding current" in (5) is the same as that in FIG. 7.

In result, the external appearance of the welding bead produced in the welding test is shown in an external view of FIG. 9B. The welding bead in FIG. 9 at the AC frequency of 40 Hz does not scatter around as spatters, and further the bead formed on the work just under the wire has a convex shape which is narrower in width and larger in height than the conventional bead. Therefore, the formed bead is satisfactory.

Why the welding bead in FIG. 9B at the AC frequency of 40 Hz is slightly convex, compared with the welding bead in FIG. 7B at the AC frequency of 20 Hz is that: since the number in which the current/voltage becomes zero per unit time is large in case that the AC frequency is high, the heat quantity to be inputted to the work decreases, it is thought.

As described above, as a result of finding of the above phenomena (A) and (B), in the invention, even under such the welding condition that the arc and the wire tip rotate by the magnetic force, using the phenomenon (A), the direction of the current flowing into the wire is switched at the predetermined cycle before the wire tip rotates at such the high speed as to blow off by a centrifugal force.

It has been confirmed that the high-speed rotation of the wire tip is stopped by this method thereby to suppress greatly the generation of the spatters and enable the stable welding.

Embodiment 2

(Welding Starts Firstly at EP and EP is Switched to EN Halfway Only Once)

<Disadvantageous Reason in Case that Switching to EN is Performed when the Current and Wire Feeding Speed are Low>

In the Embodiment 1, switching between the EP polarity and the EN polarity has been performed at the predetermined frequency (at 20 Hz in FIGS. 6 and 7, and at 40 Hz in FIGS. 8 and 9) under the condition where the welding current is 600 A or more, and the wire feeding speed is 25 m/min. or more. However, at the first of the welding start, it takes some time for the welding current value to come to 600 A or more. Similarly, it takes also some time for the wire feeding speed to come to 25 m/min. or more. In case that switching to the EN polarity is performed when the current and wire feeding speed are low, the weld penetration in the work becomes insufficient, so that there is produced a problem that the fully heated welding pool cannot be obtained just under the arc 19. Further, in case that switching to the EN polarity is performed when the wire feeding speed are low, the wire burns up by the arc during the EN polarity, which causes disadvantage such as welding to a contact chip, bead unconformity, generation of a blow hole, and the like.

<Advantageous Reason in Case that Switching to EN is Performed when the Current and Wire Feeding Speed are High>

To the contrary, in a state where the wire feeding speed is sufficiently high and the current is high, a portion just under the arc 19 of the work 7 is fully heated even in the En polarity, and a shortage of the penetration in the work 7 is not caused.

Further, in case that the wire feeding speed is sufficiently high, the burn-up by the arc during the EN polarity is prevented, so that the before-mentioned disadvantage is not produced.

Further, in case that the above phenomenon (B) is used to the contrary, during the EN polarity, the arc is generated also from the position ascending up to the upper portion of the wire as shown in FIG. 5. Therefore, in this case, it is thought that the arc enters a state where the arc does not concentrate onto the wire tip.

Therefore, when the inventor, using a welding wire of 1.4 mm in diameter under conditions where the wire feeding speed is 30 m/min. and 35 m/min. in the EN polarity, actually has observed the wire tip portion with a high-speed camera, the wire tip has kept the shape of FIG. 5, and the rotation of the wire tip droplet and the arc rotation has not been observed.

From this fact, it is assumed that: in such a state that the arc is generated from the arc tip entirety, the arc force is distributed and the wire tip is formed in the shape of a needle, so that the rotation of the wire tip droplet and the arc rotation are suppressed.

(Timing of Switching of EP to EN in Embodiment 2)

In view of such the result, in Embodiment 2, the EP polarity is switched to the EN polarity in response to the wire feeding speed.

Specifically, in case that the wire feeding speed is lower than 5 m/min., the control part 16 instructs the EP/EN switching portion 13 to keep the EP polarity.

When the current value and the wire feeding speed become large with time and the wire feeding speed comes to 5 m/min. or more, the control part 16, before the wire feeding speed exceeds 25 m/min., instructs the EP/EN switching portion 13 to switch the EP polarity to the EN polarity.

(Timing Width of Switching in Embodiment 2 is 5 m/min. to 25 m/min.)

Figure 10:
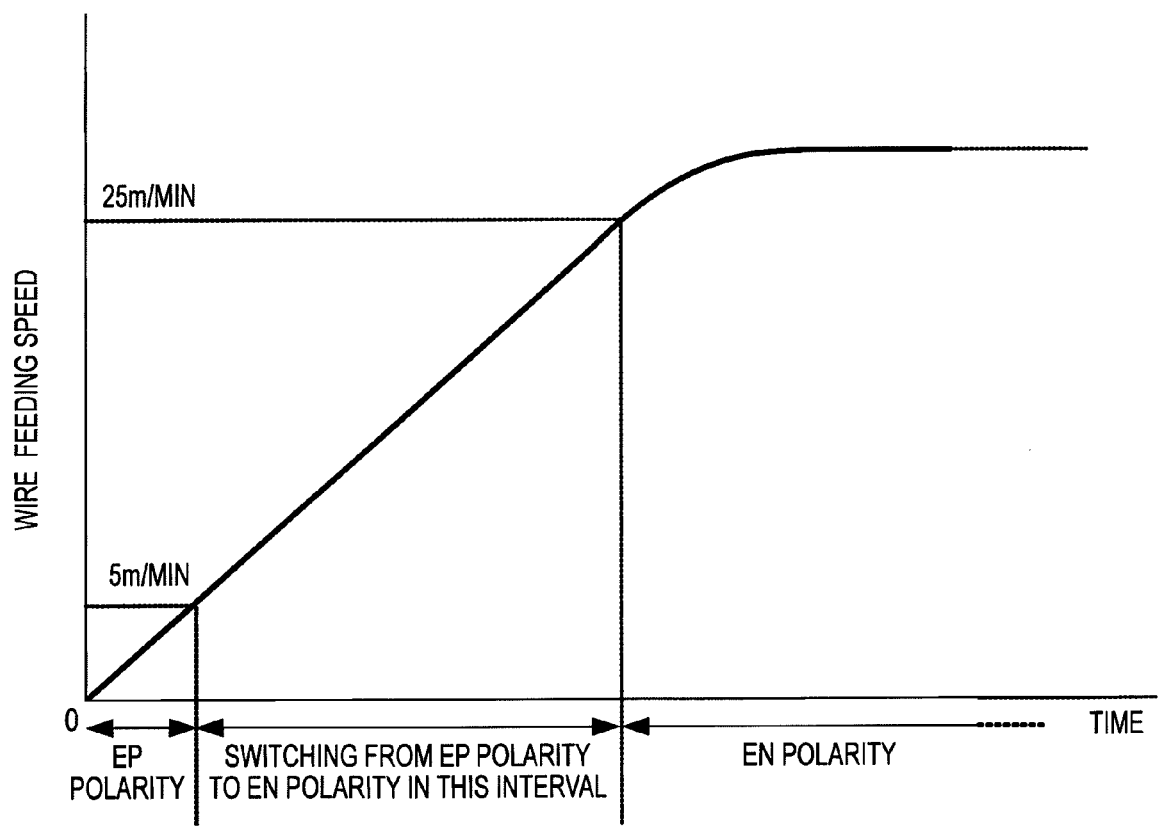
FIG. 10 is a graph showing the way of switching from the EP polarity to the EN polarity in response to the wire feeding speed.

FIG. 10 is a graph showing timing in which the EP polarity is switched to the EN polarity with the increase of wire feeding speed.

In case that a welding wire of 1.4 mm in diameter is used and the wire feeding speed is as low as to be below 5 m/min., even when the EP polarity is kept, the rotation of the wire tip droplet and the arc rotation are not produced.

Further, in case that the wire feeding speed is as high as to be 25 m/min. and more, the arc is generated also from the position ascending up to the upper portion of the wire from the wire tip by keeping the state of the EN polarity, and the arc does not concentrate on the wire tip. Therefore, the rotation of the wire tip droplet and the arc rotation are not similarly produced.

By this method, there has been confirmed an advantage that the high-speed rotation of the wire tip is stopped from the welding start to the steady sate throughout, with the result that the generation of the spatter is suppressed greatly thereby to enable the stable welding.

(Another Timing of Switching)

Though switching of the EP polarity to the EN polarity is performed in response to the wire feeding speed in the above description, this switching may be performed in response to the elapsed time from the wire feeding start. Specifically, at the first of the wire feeding start, the EP polarity is kept; and when the predetermined time (about several seconds) has passed from the wire feeding start and the wire feeding speed has increased, switching of the EP polarity to the EN polarity is performed.

(Numeric Range of Welding Wire Diameter)

Although the Embodiment 1 and Embodiment 2 have been described with reference to the test using the welding wire of 1.4 mm in diameter, also in the case where the wire diameter is about 1.4 mm (1.2 to 1.6 mm), the similar advantage can be obtained.

Namely, the range of the current density flowing into the wire in which the advantage of the invention is obtained becomes 600 A/$(\pi \cdot (0.8 \text{ mm})^2) \cong 300$ A/$\text{mm}^2$ or more.

(Composition of Mixed Shield Gas)

The ratio of argon and $CO_2$ composing the mixed shield gas used in the Embodiment 1 and Embodiment 2 is 80% to 20%. However, a shield gas in which helium or oxygen is mixed by several % in addition to $CO_2$ may be used.

What is claimed is:

1. A consumable electrode type arc welding method for generating arc between a plate-shaped work and a welding wire by a mixed shield gas including argon gas to weld the plate-shaped work, comprising:
    starting a welding while making a polarity state into a reverse electrical polarity state (EP) in which an electrical polarity of the welding wire is positive; continuing the welding while maintaining the reverse electrical polarity state before a welding wire feeding speed reaches 25 m/min; and
    switching, after welding wire feeding speed reaches 25 m/min, at least once the electrical polarity state from the reverse electrical polarity state to a positive electrical polarity state (EN) in which the electrical polarity of the welding wire is negative,
    wherein a welding current is 600 A or more.

2. The arc welding method according to claim 1, wherein
    when a welding-wire feeding speed is below 25 m/min., a state of reverse electrical polarity is made, and
    when the welding-wire feeding speed is 25 m/min or more, the state of reverse electrical polarity is switched to the state of positive electrical polarity.

3. The arc welding method according to claim 2, wherein the thickness of the plate-shaped work is 8 mm or more, the wire diameter of the welding wire is 1.2 to 1.6 mm.

4. The arc welding method according to claim 1, wherein the state of reverse electrical polarity is switched to the state of positive electrical polarity after several seconds has passed after the welding-wire feeding starts.

5. The arc welding method according to claim 4, wherein the thickness of the plate-shaped work is 8 mm or more, the wire diameter of the welding wire is 1.2 to 1.6 mm.

6. The arc welding method according to claim 1, wherein the thickness of the plate-shaped work is 8 mm or more, the wire diameter of the welding wire is 1.2 to 1.6 mm.

7. The method of claim 1, wherein a wire tip droplet and en electric arc do not rotate.

8. A consumable electrode type arc welding method for generating arc between a plate-shaped work and a welding wire by a mixed shield gas including argon gas to weld the plate-shaped work, comprising:
    making a state of reverse electrical polarity in which the electrical polarity of the welding wire is positive at the welding start time, and
    switching at least once to a state of positive electrical polarity in which the electrical polarity of the welding wire is negative and
    a welding current is 600 A or more,
    wherein
    the state of reverse electrical polarity is switched to the state of positive electrical polarity after several seconds has passed after the welding-wire feeding starts
    wherein
    switching the state of reverse electrical polarity to the state of positive electrical polarity, when the welding-wire feeding speed is 25 m/min. or more, or after several seconds has passed since the welding-wire feeding starts, and
    repeating to switch the state of positive electrical polarity to the state of reverse electrical polarity at a frequency of 10 Hz or more.

9. The arc welding method according to claim 8, wherein the thickness of the plate-shaped work is 8 mm or more, the wire diameter of the welding wire is 1.2 to 1.6 mm.

10. The method of claim 8, wherein a wire tip droplet and en electric arc do not rotate.

* * * * *